(No Model.) 3 Sheets—Sheet 1.
J. A. OSTENBERG.
CONTINUOUS AUTOMATIC MACHINE FOR THE MANUFACTURE OF STARCH.
No. 450,492. Patented Apr. 14, 1891.
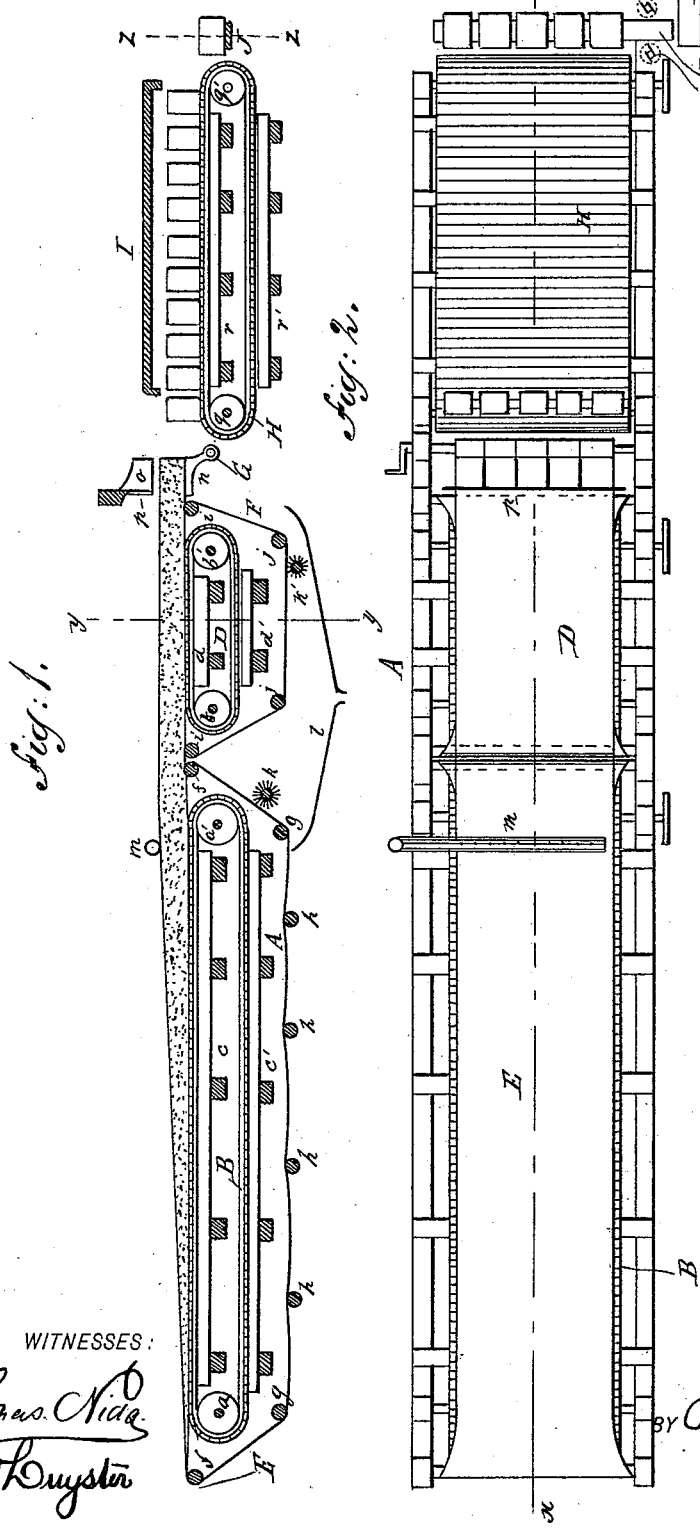

(No Model.) 3 Sheets—Sheet 2.

J. A. OSTENBERG.
CONTINUOUS AUTOMATIC MACHINE FOR THE MANUFACTURE OF STARCH.

No. 450,492. Patented Apr. 14, 1891.

WITNESSES:
Chas. Nida
Wm W. Duyster

INVENTOR:
J. A. Ostenberg
BY Munn & Co.
ATTORNEYS.

(No Model.) 3 Sheets—Sheet 3.
J. A. OSTENBERG.
CONTINUOUS AUTOMATIC MACHINE FOR THE MANUFACTURE OF STARCH.
No. 450,492. Patented Apr. 14, 1891.
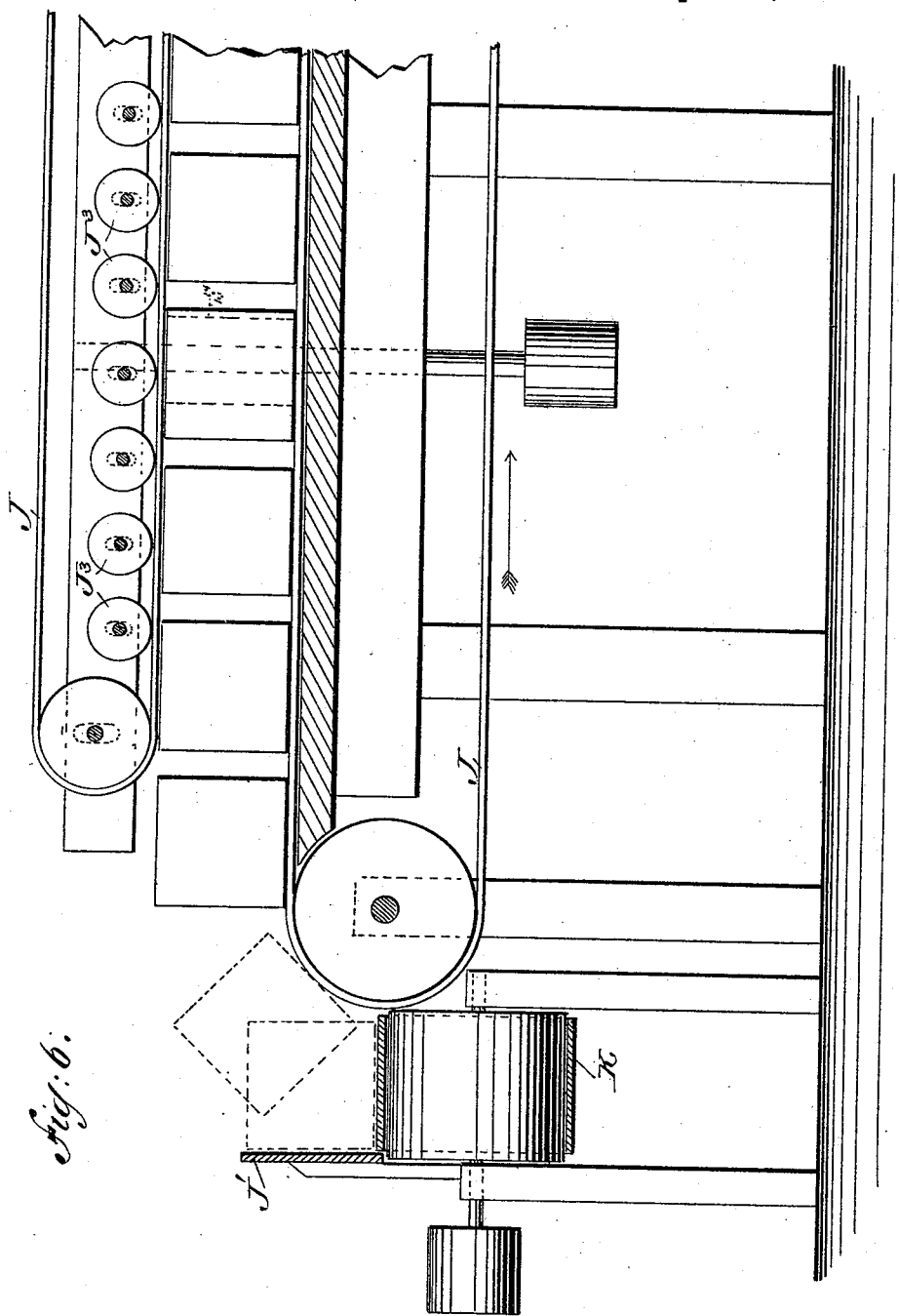
WITNESSES:
Chas. Niola.
C. Sedgwick
INVENTOR:
J. A. Ostenberg
BY Munn &Co.
ATTORNEYS

UNITED STATES PATENT OFFICE.

JOHN A. OSTENBERG, OF DES MOINES, IOWA.

CONTINUOUS AUTOMATIC MACHINE FOR THE MANUFACTURE OF STARCH.

SPECIFICATION forming part of Letters Patent No. 450,492, dated April 14, 1891.

Application filed October 19, 1889. Serial No. 327,580. (No model.)

*To all whom it may concern:*

Be it known that I, JOHN A. OSTENBERG, of Des Moines, in the county of Polk and State of Iowa, have invented a new and Improved Continuous Automatic Machine for Manufacturing Starch, of which the following is a specification, reference being had to the annexed drawings, forming a part thereof, in which—

Figure 3:
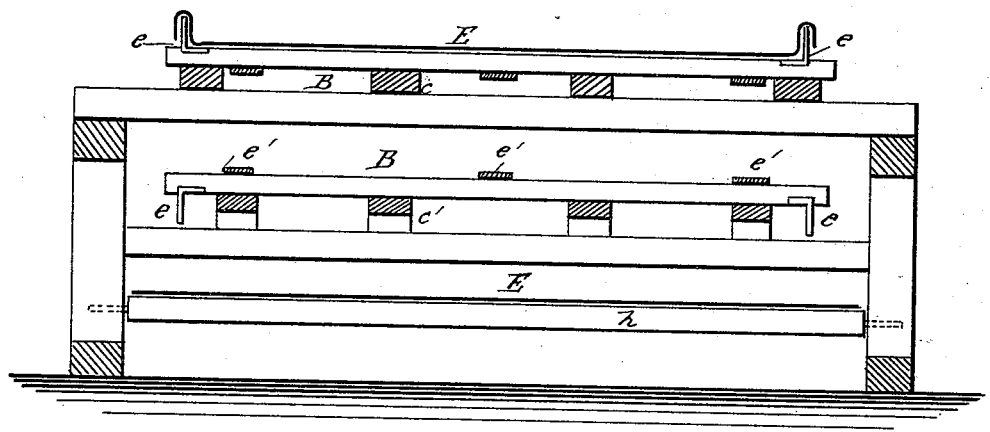
Figure 4:
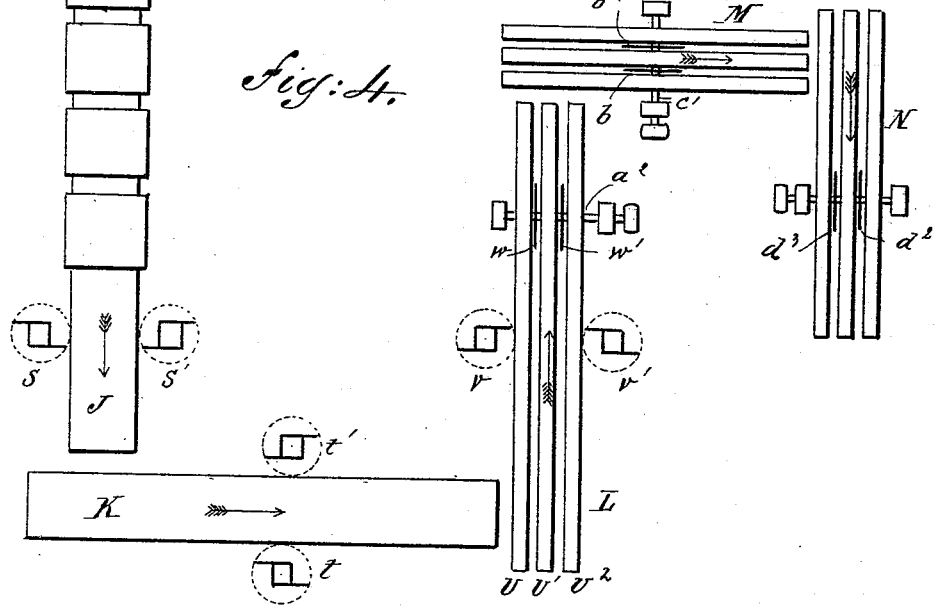
Figure 5:
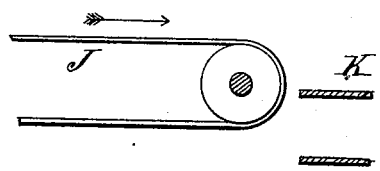

Figure 1 is a longitudinal section of my improved continuous automatic machine for manufacturing starch. Fig. 2 is a plan view. Fig. 3 is an enlarged transverse section taken on line $y\ y$ in Fig. 1. Fig. 4 is a diagrammatic view of the starch-cutting mechanism. Fig. 5 is a detail view showing the relative position of the belts; and Fig. 6 is an enlarged sectional view on the line $z\ z$, Fig. 1.

Similar letters of reference indicate corresponding parts in all the views.

My invention relates to apparatus for preparing starch in lumps for subsequent treatment. According to the usual method of preparing starch six different operations are required, the fine starch being first washed out with water, then allowed to settle in large vats, when the water is decanted, the starch is dug out and molded in wooden boxes lined with cotton cloth, and when the starch contained by the boxes becomes dry it is broken up into lumps and placed in a crusting-kiln, in which the lumps are partially dried. The drying produces a yellow crust, which necessitates the scraping of the lumps. The lumps are finally broken up ready for a subsequent drying. These operations involve a large amount of manual labor and consume a great deal of time, besides wasting a large amount of the stock and producing unsatisfactory results.

The object of my invention is to obviate these difficulties and to produce a machine in which these operations are rendered continuous, thereby saving time and labor and securing a more uniform product.

In the frame A are journaled the rollers $a$ $a'\ b\ b'$. An endless carrier B runs over the rollers $a\ a'$ and over the rails $c\ c'$. In a similar manner an endless carrier D runs over the rollers $b\ b'$ and over the rails $d\ d'$. The said endless carriers are made up of slats with L-shaped pieces $e$ attached to their ends, as shown in Fig. 3, the said slats being attached to endless belts $e'$. An endless apron E, of rubber or other water-proof material, runs over and rests upon the endless carrier B. It also runs over rollers $f$ at the ends of the endless carrier B, under rollers $g$ below the carrier B, and over the supporting-rollers $h$ below the rail $c'$. The endless apron E as it passes over the endless carrier B laps over the L-shaped pieces $e$, attached to the ends of the slats of the carrier B. The endless apron F runs over the endless carrier D, over the rollers $i$, and under the rollers $j$, arranged below the rail $d'$.

In the lower part of the frame A are journaled rotary brushes $k\ k'$, which revolve in contact with the endless aprons E F and remove any starch adhering to the said endless aprons. The brushes $k\ k'$ are supplied with water, and the waste water is received and carried away by the receptacle $l$. The endless apron F is not of water-proof material, but is preferably made of some absorbent fibrous material, such as heavy cotton cloth.

Above the forward end of the endless apron E is arranged a supply-pipe $m$ for feeding the starch mixture to the endless aprons. The endless aprons E F are arranged near together, as shown in Figs. 1 and 2, so that the starch deposited upon the apron E may be delivered to the apron F. Both of these aprons are carried forward at the same speed by their respective carriers, which receive motion from any suitable propelling-power.

Beyond the apron F is journaled a rock-shaft G, carrying angled arms $n$, which are supported so that their upper surfaces lie in the same plane as the upper surface of the endless apron F. These arms $n$ are arranged to slide longitudinally upon the shaft G, and the said shaft G is connected with the mechanism in such a way as to cause it to oscillate intermittingly. Above the arms $n$ are arranged knives $o\ o\ o\ o\ p$, which are arranged to be reciprocated by suitable mechanism. When the said knives are brought down, they cut the layer of starch being carried forward, so as to leave a parallelopipedal block of starch upon each arm $n$. As soon as the blocks are separated from the body of the starch the arms $n$ are slid lengthwise of the shaft G, thereby separating the blocks.

In front of the endless apron F and near the rock-shaft G is arranged an endless carrier H, which runs over rollers $q$ $q'$ and over rails $r$ $r'$. The upper portion of the endless carrier H is below the level of the upper part of the endless apron F, and the said endless carrier H runs through a crusting-oven I. When the shaft G is turned in the direction required to carry the arms $n$ forward, the starch blocks separated by the said arms $n$ are delivered on their ends to the endless carrier H, and are carried slowly forward through the crusting-oven and delivered at the forward end of the carrier to a transverse endless belt J, which is clearly shown in Fig. 6. The endless belt J passes between rotary cutters $s$ $s'$, which trim the starch lumps, and after the lumps pass the rotary cutters $s$ $s'$ they are delivered by the endless carrier J to the endless carrier K, which moves in the direction indicated by the arrow. In passing from the endless carrier J to the endless carrier K the block is turned a quarter of a revolution, so that new surfaces are presented to the second set of rotary cutters $t$ $t'$, arranged on opposite sides of the endless carrier K. After the lumps are trimmed by these cutters they are delivered to the carrier L, formed of three parts $u$ $u'$ $u^2$, and in the transfer from the endless carrier K to the endless carrier L the lumps are turned another quarter of a revolution, so as to present new surfaces to the cutters $v$ $v'$, arranged upon opposite sides of the endless carrier L. After passing the cutters $v$ $v'$ the lumps are carried forward over circular saws $w$ $w'$, mounted on the mandrel $a^2$. In this manner each lump is separated into three parts. The lump is carried forward and delivered to the endless carrier M, which carries it over the circular saws $b^2$ $b^3$ on the mandrel $c'$. In a similar manner the lump is carried forward by the endless carrier M and delivered to the endless carrier N, which carries it over the saws $d^2$ and $d^3$. Each of the belts J K L M N are placed successively in lower planes (see Figs. 5 and 6) to cause the lumps to roll and rest on another side when passing from one belt to another, as shown in dotted lines in Fig. 6. In practice stationary side guards J' will be placed at points opposite to where one belt delivers to another, as shown in Fig. 6, to prevent the blocks from falling off, though ordinarily the lumps are of a size to render this unnecessary, and above and parallel with the said belts endless belts may be placed, as shown at J², Fig. 6. The lower half of the belt J² is weighted by vertically-movable rollers J³, so that the lumps will be prevented from becoming displaced when the cutters are acting upon them.

The starch liquid is delivered to the endless apron E through the perforated tube $m$, and as the endless apron moves forward the starch, piling up on the endless apron, as shown in Fig. 1, forms an inclined plane, down which the starch liquid must flow toward the rear end of the machine. The starch settles on the water-proof apron for the same reason that it settles on a common starch-table. The thickness of the layer is of course regulated by the speed of the apron. If a given volume of flow of starch milk will produce a layer four inches thick at the supplying-point in twelve hours, it follows that if the apron is made to travel the length of the settling-surface in the same time a continuous layer of four inches thick will be discharged therefrom. The cutting of the starch is not effected until the starch has been drained on the porous apron F. As the process proceeds, the layer of starch is delivered to the endless apron F, by which it is carried forward to the arms $n$. The knives $o$ $p$, coming down upon the starch, cut off the blocks of starch, as above described.

Having thus described my invention, I claim as new and desire to secure by Letters Patent—

1. In a continuous automatic machine for manufacturing starch, the combination of an endless water-tight carrier provided with apron-supports, an endless apron adapted to run over the endless carrier, and a supply-pipe for delivering the starch mixture to the endless apron, substantially as specified.

2. In a continuous automatic machine for manufacturing starch, the combination of an endless carrier provided with apron-supports, an endless apron of water-proof material arranged to be carried forward by the endless carrier, an endless carrier, and a porous endless apron for receiving the starch from the water-proof endless apron, substantially as specified.

3. The combination, with a continuous starch-table, of a series of knives for cutting the starch into lumps and receiving-arms for supporting the starch while being cut, substantially as specified.

4. The combination, with a continuous starch-table having a lump-forming mechanism, of an endless carrier adapted to receive the lumps of starch from the lump-forming mechanism and a crusting-oven through which the carrier passes, substantially as specified.

5. In a continuous automatic machine for manufacturing starch, the combination, with the lump forming and crusting apparatus, of a series of endless carriers arranged at right angles to each other and a series of cutters arranged upon opposite sides of the endless carriers, substantially as specified.

6. In a continuous automatic machine for manufacturing starch, the combination, with the lump forming and crusting apparatus, of a series of endless carriers arranged at right angles to each other, a series of cutters arranged upon opposite sides of the endless carriers, and a series of saws for sawing the lumps, substantially as specified.

7. The combination, with an endless carrier having parallel apron-supports e, an endless water-tight apron passing around said table with its edges overlapping said supports, and a starch-supply pipe delivering upon said apron, of a porous carrier to which said apron delivers and a lump-forming mechanism at the delivery end of the carrier, substantially as set forth.

8. In the manufacture of starch, the method consisting in forming continuously a layer of starch of the desired thickness, feeding the same forward, and severing the layer as fed into lumps, substantially as set forth.

9. In the manufacture of starch, the method consisting in forming continuously a layer of starch of the desired thickness, feeding the same forward, severing the layer as fed into lumps, and then drying the lumps, substantially as set forth.

10. In the manufacture of starch, the method of forming a continuous layer of even thickness, which consists in discharging the starch milk in a continuous stream upon a movable surface until the starch has accumulated in a conglutinated mass under said supply to the desired thickness of the layer, and then moving the said surface under the said continuous stream at a rate of speed which will cause the layer to continue to form at the same thickness and preserve its continuity or integrity, substantially as described.

11. The herein-described method of manufacturing starch, which consists in forming continuously a layer of starch of the desired thickness, feeding the same forward, severing the layer as fed into lumps, drying the lumps, and then trimming and subdividing the same, substantially as set forth.

JOHN A. OSTENBERG.

Witnesses:
W. M. NEWELL,
JOHN G. O'BRIEN.